United States Patent [19]

Perrichon

[11] Patent Number: 4,849,609

[45] Date of Patent: Jul. 18, 1989

[54] HIGH-EFFICIENCY ELECTRIC COOKER INTENDED MORE PARTICULARLY FOR RESTAURANTS OR CANTEENS

[75] Inventor: Francois Perrichon, Ris Orangis, France

[73] Assignee: Societe Perrichon, Bretigny Sur Orge, France

[21] Appl. No.: 55,824

[22] Filed: May 29, 1987

[30] Foreign Application Priority Data

May 30, 1986 [FR] France ................. 86 07794

[51] Int. Cl.⁴ .............................................. H05B 3/70
[52] U.S. Cl. .................................. 219/449; 219/443; 219/463; 219/464
[58] Field of Search ............... 219/449, 443, 445, 446, 219/447, 448, 453, 459, 463, 464, 456, 460, 521; 99/425, 422, 444, 446, 9 R

[56] References Cited

U.S. PATENT DOCUMENTS

| | | | |
|---|---|---|---|
| 1,657,204 | 1/1928 | Ehrgott | 219/459 |
| 1,700,597 | 1/1929 | Rogers | 219/460 |
| 2,978,564 | 4/1961 | Blanding | 219/449 |
| 3,317,709 | 5/1967 | Beasley | 219/449 |
| 3,418,921 | 12/1968 | Fautz | 99/446 |
| 4,095,902 | 6/1978 | Florer | 356/155 |
| 4,251,713 | 2/1981 | Landfors | 219/463 |
| 4,589,399 | 5/1986 | Hamill | 126/9 R |
| 4,649,263 | 3/1987 | Goodlaxson | 219/463 |

Primary Examiner—Teresa J. Walberg
Attorney, Agent, or Firm—Seidel, Gonda, Lavorgna & Monaco

[57] ABSTRACT

A high-efficiency electric cooker intended more particularly for restaurants or canteens, has heating resistances (4) detachably locked between the conductive surface (1) and a retaining surface (14) of similar shape and dimensions situated beneath the conductive surface. The heating resistances (4) are connected by supply leads (23) to standard commercial electrical components (24) wired to plug-in bases and disposed in a control drawer (25) fitted on the mounting (2) of the device, closed by a cowl (26) at the rear and provided, at the front, with a control panel (6) enabling the supply to the heating resistances (4) to be controlled.

6 Claims, 4 Drawing Sheets

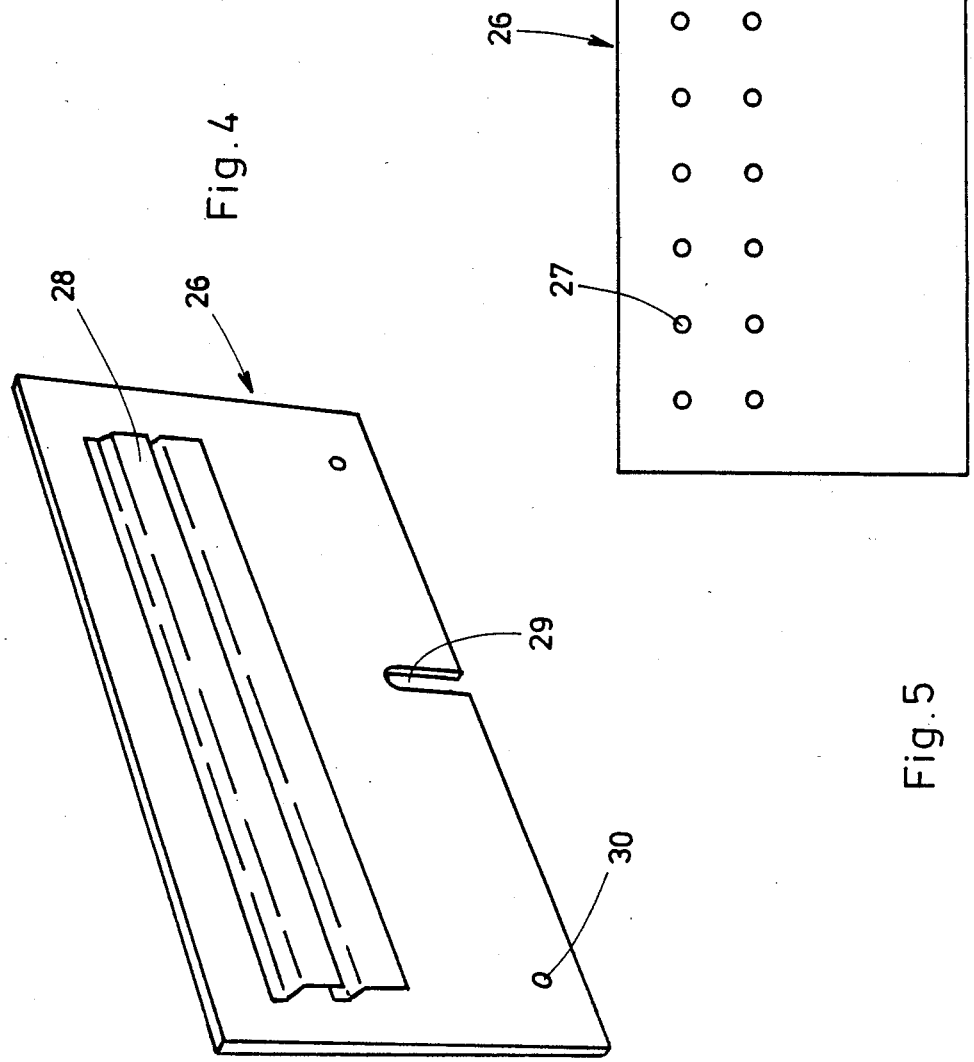

HIGH-EFFICIENCY ELECTRIC COOKER INTENDED MORE PARTICULARLY FOR RESTAURANTS OR CANTEENS

BACKGROUND OF THE INVENTION

This invention relates to a high-efficiency electric cooker intended more particularly for restaurants or canteens.

At the present time there is no device on the market capable of guaranteeing satisfactory and fast cooking of sized and deep-frozen meats of the kind daily distributed in large quantities to large-area users or high-output restaurants on the lines of the American fast food restaurants.

The object of the invention is to fill this gap by providing a device capable of rapid and efficient cooking both of hamburgers and other foods such as grills, eggs, sausages, bread, etc., while complying with the rules of elementary hygiene.

Another object of the invention is to provide a device of the above type which is extremely simple to use and with no risks to the professional or the user, and of minimum cost in respect of manufacture, servicing and maintenance.

The device comprises conventionally a conductive surface resting on a mounting and co-operating with heating means and with electronically controlled temperature control means.

The device is characterised in that the heating means comprise heating resistances detachably locked between the conductive surface and a retaining surface of similar shape and dimensions situated beneath the conductive surface, and are connected by supply leads to standard commercial electrical components wired to plug-in bases and disposed in a control drawer filled on the mounting of the device, closed by a cowl at the rear and provided, with a control panel enabling the supply to the heating resistances to be controlled.

According to the invention, the term "surface" should be considered in a very wide sense and although the device is more generally in the form of a flat grill-type cooking surface it may in some cases comprise a hollow device intended to receive frying oil.

The main feature of the device according to the invention is linked to the presence of the control drawer, which contains only standard components which can therefore be very easily replaced in the event of breakdown. Also, in the event of major electrical problems on the equipment the drawer can be instantaneously replaced by an identical pre-connected drawer without any interruption to operation, something which could be very disadvantageous particularly in a restaurant.

All the operations on the electrical components in the drawer are generally carried out from the rear of the device (by opening the cowl). To facilitate access to these different components it is advantageous to incline them slightly upwards from the rear part.

According to the invention, the control drawer will usually be made from a sheet metal, more particularly a 15/10 solid stainless steel sheet for the facing elements (rear cowl and control panel) and perforated for the base so as to provide good ventilation of the interior.

According to another feature of the invention, the temperature control means comprise at least one probe disposed in a bore provided for this purpose in the conductive surface and cooperating with standard commercial electronic controllers disposed in the control drawer As a result, the control drawer contains all the "drive" for the device. To guarantee user safety, and particularly the safety of the maintenance personnel, according to another feature of the invention, it comprises a safety switch mounted in the control drawer and breaking the power supply to all the electrical components and electronic components in the event of the drawer being opened.

To improve the efficiency of the device according to the invention, there must be optimum utilization of the energy transmitted to the conductive surface by the heating resistances and the heat losses must be minimized as far as possible.

To meet the first of these requirements, the conductive surface is preferably formed by a chromium plated metal horizontal hot plate polished to give it a mirror finish.

For example, it is possible to use a polished steel plate 18 mm thick which has had a 60 micron pure chromium surface treatment and then been repolished to bring it to 50 microns. The result of this treatment is to give the plate an irradiating effect and hence improve its performance.

On the same lines, to obtain satisfactory results, the performance of the hot plate should be identical at every point on its surface. To this end, the fact that the maximum heat dissipation occurs at the edges of the plate must be taken into account by providing more powerful resistances in the lateral part of the plate than in its central part.

By way of example, it has been possible to obtain satisfactory results by providing the plate with 1800 watt lateral resistances and 1500 watt central resistances.

In order to identify and eliminate any risk of confusion of these resistances, particularly in the event of replacement, they are advantageously connected to the control drawer by supply leads of different colours (e.g. red for 1800 watts and 1500 watts).

To reduce the heat losses and obtain perfect heat exchange between the hot plate and the heating resistances, the latter must be locked adequately against the hot plate.

To this end, and according to another feature of the invention, the retaining surface comprises a metal retaining plate, more particularly of steel, of the the same dimensions as the hot plate to which it is pivotally connected by means of at least one and preferably two hinges having hinge pins, at its front part and having, at the rear, at least one and preferably two fixing lugs formed with bores co-operating with similar fixing lugs provided at the rear of the hot plate to receive bolts for fixing the two plates and locking the heating resistances between them.

This feature gives adequate clamping of the two plates and hence good locking of the heating resistances while allowing easy access to the latter, particularly in the event of a breakdown, for replacement purposes, simply by means of the bolts.

According to another feature of the invention, which provides maximum locking or clamping of the resistances at the front between the two plates, the axis of the hinge pins connecting the plates is adjustably inclined to the plane of the plates.

For this adjustment the hinge pins used will often have an eccentric axis and be provided with a diameter adjustment bush.

To improve the efficiency of the device, the energy dissipation via the bottom part of the retaining plate must also be minimized, for which purposes and according to another feature of in invention, the retaining plate is connected by its bottom part to a casing, more particularly a metal casing, containing a thermal insulator, more particularly compressed rock wool.

According to another feature of the invention, the cowl closing the rear part of the control drawer is formed with perforations co-operating with deflectors to allow ventilation of the electrical components and electronic component.

According to another feature of the invention, the top of the mounting has a base to receive the hot plate, said base being hollowed out at the centre and having two longitudinal side slots for the discharge of cooking fat or oil and each communicating with a sealed slide open at the top of the device to receive a fat and oil recovery drawer.

The hot plate is fixed to the base more particularly by welding during manufacture. The assembly formed by the base and the sealed slides preferably forms an integral assembly made from sheet metal, in which the side slots are formed by pressing. These elements will preferably have a rounded shape to facilitate cleaning. For the same purpose, the handles of the fat and oil recovery drawers are preferably made in an integral form with the drawers to give a clean and smooth elevation.

For functional use of the device it is also advantageous to provide the front of the hot plate with a bar, more particularly of tubular stainless steel, to allow th fitting of detachable plates.

Also, the obtain maximum satisfaction, the device should be provided with safety means for monitoring proper operation of each of the heating resistances. Such means may advantageously be indicator lights disposed on the control panel and lighting up automatically for a predetermined time when the device is switched on. Of course, the number of indicator lights provided must be identical to the number of heating resistances.

The features of the device according to the invention will be described in greater detail with reference to the accompanying drawings wherein:

BRIEF DESCRIPTION OF THE FIGURES

FIG. 4 shows the rear surface of the rear cowl;

FIG. 5 shows the front surface of the rear cowl.

The drawings illustrate the specific cased in which the conductive surface comprises a horizontal hot plate; as already stated this specific case is to be considered solely as an example and the heating surface could be different without thereby departing from the scope of the invention.

DETAILED DESCRIPTION OF THE PREFERRED EMBODIMENT

Figure 1:
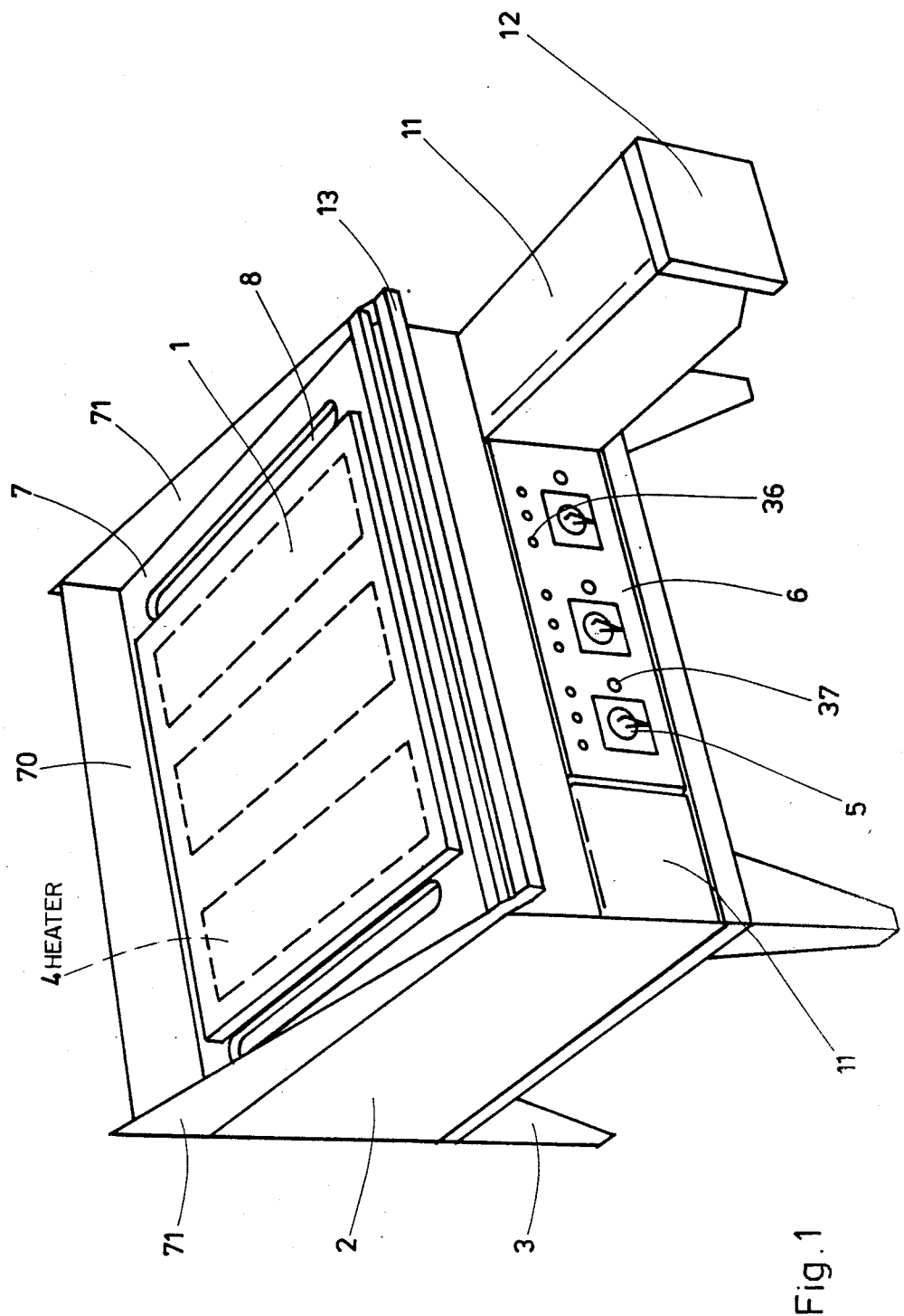
FIG. 1 is a perspective view of the front of the device.

Referring to FIG. 1, the device according to the invention consists basically of a horizontal hot plate 1 resting on a mounting 2 having legs 3.

To heat the plate 1 the bottom part thereof is provided with heating resistances 4, the power supply to which is controlled by control knobs 5 disposed on a control panel 6 at the front of the device.

The drawings show three groups of three resistances 4 each connected to a knob 5. This is of course simply one example of the configuration, to which the invention is in no way limited.

The hot plate 1 is made of polished chromium-plated steel; it rests on a base 7 which is hollowed out in the centre and which is provided at the top of the mounting 2 to which it is welded. As will be apparent from FIG. 1, the periphery of base 7 is provided with a rectangular rear protective sheet 70 and also two triangular side protective sheets 71. The base also has two longitudinal slots 8 on either side of the hot plate 1 to allow the discharge of fats and oils.

Figure 2:
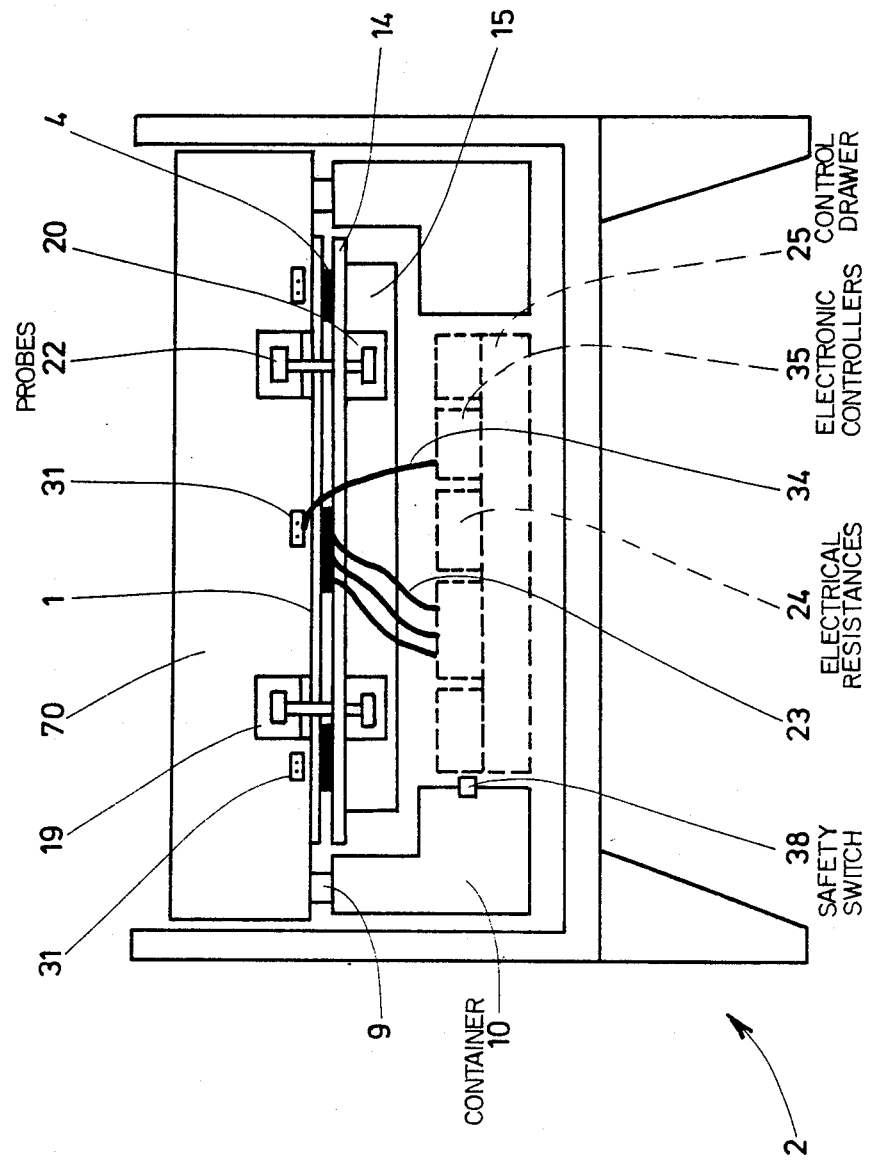
FIG. 2 is a rear view of the device.
Figure 3:
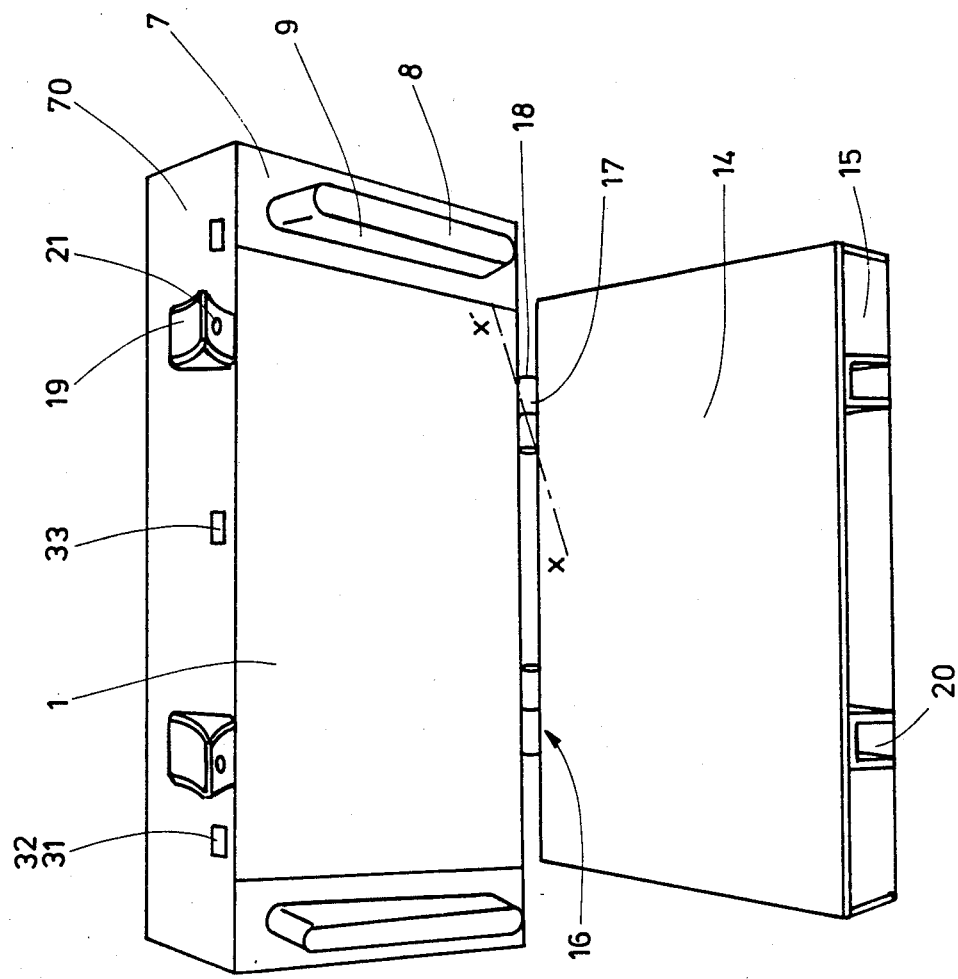
FIG. 3 shows the hot plate and retaining plate in the position

The slots communicate with two outlets 9 which are formed by pressing and which are visible in FIG. 3 and partially in FIG. 2.

Referring to FIGS. 1 and 2, these objects lead into containers 10 in the mounting 2, which are open at the top to act as a slide for fat and oil recovery drawers 11 on either side of the control panel 6 (FIG. 1).

In order to facilitate maintenance of the device, the handles 12 of the drawers 11 are integral therewith.

Referring to FIG. 1, the device also comprises a bar 13 at the top of the hot plate 1 for the fitting of detachable plates.

Referring to FIGS. 2 and 3, the resistances 4 are detachably secured between the hot plate 1, which is welded to the base 7 at the side, and a steel retaining plate 14 of equivalent shape and dimensions. In order to minimize heat losses from the bottom surface of the retaining plate 14 the latter is connected to a casing 15 containing a thermal insulator such as compressed rock wool; the casing may, for example, be made from stainless steel flat stiffening elements (not shown).

To enable the heating resistances to be fitted between the two plates 1 and 14 may be replaced in in the event of breakdown, the plates are pivotally connected at the front of the device (see FIG. 1) by means of two hinges 16 having hinge pins 17 whose axis x-x' is inclined to the plane of the plates 1 and 14; this inclination can be adjusted by means of an adjustment bush 18, actuation of which provides maximum clamping of the plates 1 and 14 and hence of the resistances 4 between them.

To lock the resulting assembly in the closed position, the plates 1 and 14 respectively have at the rear fixing lugs 19, 20 the central parts of which have registering bores 21 to receive fixing bolts 22 shown in FIG. 2. Once the bolts have been secured the resistances 4 are thus closely locked against the hot plate 1 for which they provide optimum heating. To power the resistances 4 they are connected by standard power supply leads 23, three of which are shown via way of example in FIG. 2, to standard commercial electrical resistances 24 wired to plug-in bases. For the sake of clarity they will not be described in greater detail hereinafter.

The electrical components 24 are disposed in a control drawer 25 shown in broken lines in FIG. 2, and are fitted in a housing specially provided for this purpose in the mounting 2. Although not shown in the drawing, the drawer consists of flat side sheets and a perforate bottom sheet providing perfect ventilation of the whole device. At the front the drawer is closed by the control panels 6 shown in FIG. 1, and at the top by a rear cowl 26 illustrated in FIGS. 4 and 5. It consists of a sheet, more particularly of stainless steel, formed with perforations 27 (FIG. 5) for ventilation, safety deflectors 28 (see FIG. 4) being welded thereon. The cowl 26 also has an opening 25 to allow the general power supply cable to pass, and locks 30 to lock the device.

A safety switch 38 is fitted on the mounting 2 to switch off the supply to all the electrical components 24 in the event of the drawer 25 being opened.

The device according to the invention also has means for controlling the temperature in the form of three probes 31 of the thermocouple type which are fitted in bores 32 provided for this purpose at the rear of the hot plate 1. These bores are also closed by strips 33. Referring to FIG. 2, the probes 31 are connected by leads 34 to standard commercial electronic controllers 35 also disposed in the control drawer 25. The latter therefore contains all the control means for the device, and as already stated this is extremely practical for replacement purposes.

Referring to FIG. 1, to facilitate its use the device comprises means enabling proper operation of each of the heating resistances 4 to be checked. These means comprise indicator lights 36 associated with each of the electrical resistances and automatically lighting up for a period of 5 to 6 seconds whenever the device is started from knob 5. Indicator lights 37 of a different colour also show that the equipment is switched on.

Of course the above description is intended solely by way of example and can be modified without departing from the scope of the invention.

I claim:

1. A high-efficiency electric cooking device intended more particularly for restaurants or canteens and comprising a conductive surface resting on a mounting (2) and co-operating with heating means and with electronically controlled temperature control means (31), said device being characterized in that said conductive surface comprises a chromium plated metal horizontal hot plate (1) of mirror finish and that said heating means comprise heating resistances (4) attachably locked between said hot plate and a retaining surface, wherein said retaining surface comprises a metal retaining plate (14) of the same dimensions and situated beneath said hot plate, said retaining plate being pivotably connected by means of at least one hinge (16) having hinge pins (17) at the front of said retaining plate and having, at the rear of said retaining plate, at least one fixing lug (20) formed with bores (21) co-operating with similar fixing lugs (19) provided at the rear of said hot plate to receive bolts (22) for fixing together said hot plate and said retaining plate, and locking said heating resistances between said hot plate and said retaining plate.

2. A device according to claim 1, characterized in that the axis (x-x') of said hinge pins (17) connecting said hot plate and said retaining plate is adjustably inclined with respect to the plane of said hot plate and said retaining plate.

3. A device according to claim 1 characterized in that said retaining plate is connected by its bottom part to a casing (15) containing a thermal insulator.

4. A high-efficiency electric cooking device intended more particularly for restaurants or canteens and comprising a conductive surface (1) resting on a mounting (2) and cooperating with heating means and with electronically controlled temperature control means (31), said device being characterized in that said heating means comprise heating resistances (4) detachably locked between said conductive surface and a retaining surface (14), wherein said retaining surface is of similar shape and dimensions and situated beneath said conductive surface, and wherein said heating resistances are connected by power supply leads (23) to standard commercial electrical components (24) wired to plug-in bases and disposed in a control drawer (25) fitted on said mounting of said device, said control drawer having a safety switch (38) for breaking the power supply to all said electrical components (24) in the event of said control drawer being opened, said retaining surface being closed by a cowl (26) at the rear of said retaining surface and provided, at the front of said retaining surface, with a control panel (6) enabling the supply of power to said heating resistances to be controlled.

5. A high-efficiency electric cooking device having a conductive surface (1) resting on a mounting (2) and co-operating with heating means and with electronically controlled temperature control means (31), characterized in that said heating means comprise heating resistances (4) detachably locked between said conductive surface and a retaining surface (14) of similar shape and dimensions and situated beneath said conductive surface, said retaining surface comprising a metal retaining plate pivotably connected at its front part by at least one hinge having pins and at its rear having two fixing lugs, said heating means being connected by power supply leads (23) to standard commercial electrical components (24) wired to plug-in bases and disposed in a control drawer (25) fitted on said mounting and closed by a cowl (26) at the rear of said retaining plate and provided, at the front of said retaining plate with a control panel (6) for controlling the power supplied to said heating resistances.

6. A high-efficiency electric cooking device having a conductive surface (1) resting on a mounting (2) co-operating with heating means and with electronically controlled temperature control means (31), characterized in that said heating means comprise heating resistances (4) detachably locked between said conductive surface and a retaining surface (14) of similar shape and dimensions and situated beneath said conductive surface, said heating resistances being connected by power supply leads (23) to standard commercial electrical components (24) wired to plug-in bases and disposed in a control drawer (25) on said mounting (2), said control drawer (25) having a safety switch (38) for breaking the power supply connection to all of said electrical components (24), said retaining surface (14) being closed by a cowl (26) at the rear of said retaining surface and provided, at the front of said retaining surface, with a control panel (6) for controlling power supplied to said heating resistances.

* * * * *